United States Patent
Loxley et al.

(10) Patent No.: US 7,111,476 B2
(45) Date of Patent: Sep. 26, 2006

(54) ELECTROPHORETIC DEPOSITION PROCESS FOR MAKING QUARTZ GLASS PRODUCTS

(76) Inventors: Ted A Loxley, 236 Tom Corwin Rd., Wellston, OH (US) 45692; John F. Blackmer, 5780 Springwood Ct., Mentor-on-the-Lake, OH (US) 44060; Klaus-Markus Peters, 6717 Elmwood Rd., Mentor, OH (US) 44060

( * ) Notice: Subject to any disclaimer, the term of this patent is extended or adjusted under 35 U.S.C. 154(b) by 423 days.

(21) Appl. No.: 10/139,940

(22) Filed: May 7, 2002

(65) Prior Publication Data

US 2002/0152768 A1    Oct. 24, 2002

Related U.S. Application Data

(63) Continuation-in-part of application No. 09/481,208, filed on Jan. 11, 2000, now Pat. No. 6,381,986, which is a continuation of application No. 08/804,234, filed on Feb. 22, 1997, now Pat. No. 6,012,304, which is a continuation of application No. 08/269,002, filed on Jun. 30, 1994, now abandoned.

(51) Int. Cl.
*C03B 8/02* (2006.01)
*C03B 19/02* (2006.01)

(52) U.S. Cl. .................................. 65/17.2; 65/17.3
(58) Field of Classification Search ............... 65/17.2, 65/17.3, 395
See application file for complete search history.

(56) References Cited

U.S. PATENT DOCUMENTS

| | | | | |
|---|---|---|---|---|
| 3,718,564 A | * | 2/1973 | Ebrey | 204/483 |
| 3,850,733 A | * | 11/1974 | Szabo | 204/483 |
| 3,882,010 A | * | 5/1975 | Szabo | 204/483 |
| 4,072,489 A | * | 2/1978 | Loxley et al. | 65/17.3 |
| 4,210,504 A | * | 7/1980 | Friedel et al. | 204/549 |
| 4,357,222 A | * | 11/1982 | Lucek | 204/472 |
| 4,684,386 A | * | 8/1987 | Clasen | 65/396 |
| 4,689,066 A | * | 8/1987 | Clasen et al. | 65/395 |
| 4,885,018 A | * | 12/1989 | Bachmann et al. | 65/404 |
| 5,120,444 A | * | 6/1992 | Clasen | 210/639 |
| 5,389,406 A | * | 2/1995 | Doebler et al. | 204/488 |
| 5,389,582 A | * | 2/1995 | Loxley et al. | 501/4 |
| 5,624,540 A | * | 4/1997 | Jorgens | 204/625 |
| 6,012,304 A | * | 1/2000 | Loxley et al. | 65/111 |
| 6,059,949 A | * | 5/2000 | Gal-Or et al. | 204/484 |
| 6,381,986 B1 | * | 5/2002 | Loxley et al. | 65/17.5 |

(Continued)

*Primary Examiner*—Carlos Lopez
(74) *Attorney, Agent, or Firm*—Vincent A. Greene

(57) ABSTRACT

Cup-shaped porous silica preforms suitable for manufacture of large 24-inch crucibles used in Czochralski crystal-growing furnaces are produced by a unique electrophoretic casting process using a high-purity aqueous silica slip or slurry having a predetermined particle-size distribution, an average particle size of from 6 to 10 microns and a solids content of from 80 to 85 percent by weight. The slurry contains an electrolyte, such as ammonium hydroxide, has a pH of from 7.5 to 8.5, and can be wet milled at a pH of at least 7 in such manner as to provide the micronized silica particles with excellent electrophoretic mobility, thereby providing a superb process for economical mass production of large pure silica preforms using safe voltages, such as 20 to 40 volts. The electrophoretic casting apparatus can be of the type shown in FIGS. 1 and 2 and includes a permeable porous cup-shaped carbon-graphite mold (2) that serves as a positive anode and an internal reticulate or perforated cathode (3) of similar shape having a thin pervious cover means, such as the shroud 25, to prevent local dilution of the slurry at the cathode.

17 Claims, 1 Drawing Sheet

U.S. PATENT DOCUMENTS

2003/0159648 A1* 8/2003 Schwertfeger et al. ........ 117/84
2004/0053767 A1* 3/2004 Schwertfeger et al. ........ 501/54
2004/0216486 A1* 11/2004 Schwertfeger et al. ....... 65/17.2

* cited by examiner

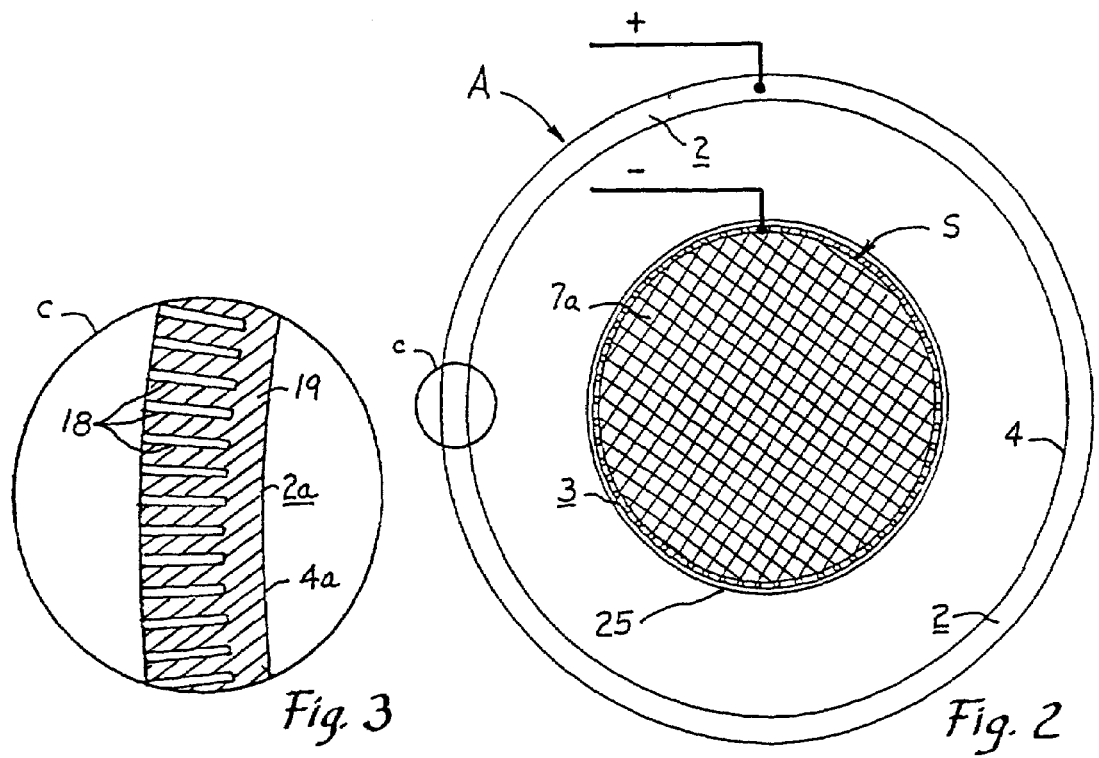
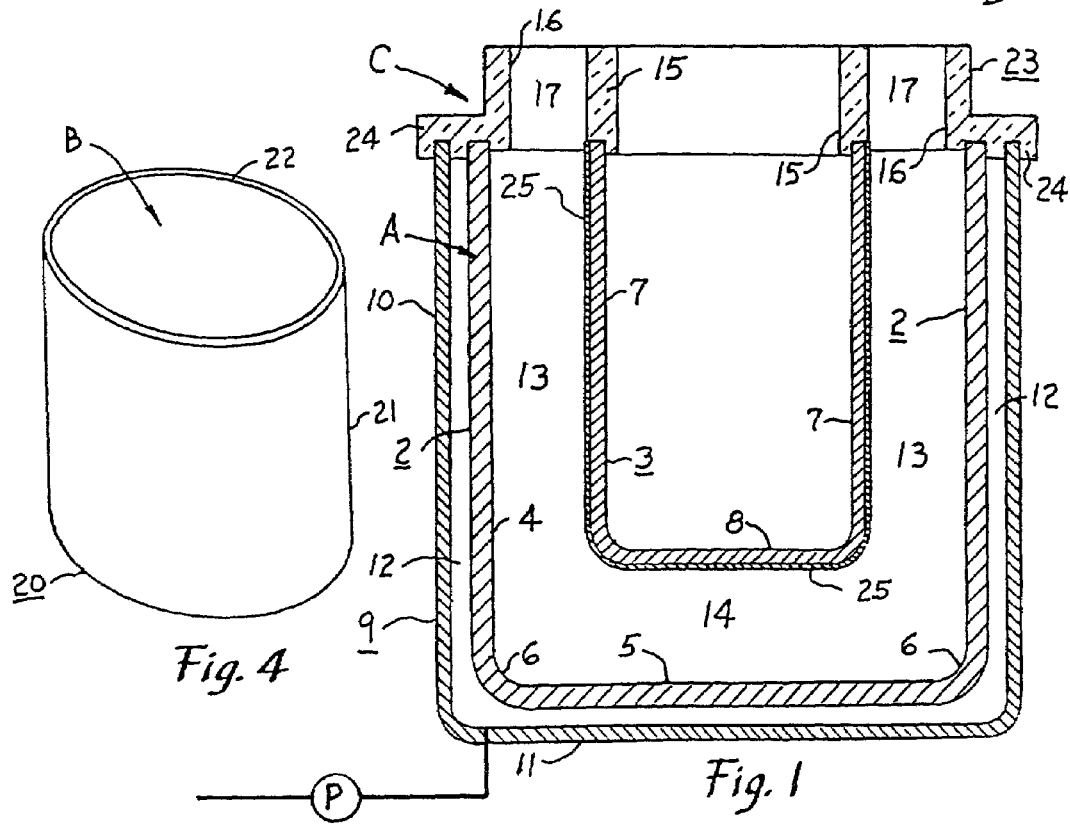

ELECTROPHORETIC DEPOSITION PROCESS FOR MAKING QUARTZ GLASS PRODUCTS

The present application is a continuation-in-part of application Ser. No. 09/481,208 filed Jan. 11, 2000, now U.S. Pat. No. 6,381,986, which is a continuation of application Ser. No. 08/804,234 filed Feb. 22, 1997, now U.S. Pat. No. 6,012,304, which is a continuation of application Ser. No. 08/269,002, filed Jun. 30, 1994, now abandoned.

The present application relates to the manufacture of sintered quartz glass products and to processes for making such products from porous silica preforms. The invention is particularly concerned with the making of quartz glass articles by electrophoretic deposition.

BACKGROUND OF THE INVENTION

Electrophoresis has been known for more than 100 years and has been used in a variety of ways as a technique for the coating of metal articles. This technique has been employed for depositing metals, oxides, phosphors, rubber, paints, polymers and other materials using both aqueous and non-aqueous media. It has been used extensively in the commercial manufacture of rubber products from latex and in automotive painting.

In the ceramic manufacturing industry, the use of electrophoretic deposition has been rather limited. There are a few processes which have had substantial commercial value. One involves the electroforming of beta-alumina articles for use in high-energy sodium-sulfur and sodium-halogen batteries (see U.S. Pat. No. 3,946,751) and another involves the formation of thin continuous strips of clay, suitable for cutting into tiles or plates (see Chronberg U.S. Pat. Nos. 4,092,231 and 4,170,542). So far the use of the Chronberg process for manufacture of ceramic tile from clay suspensions has not been fully exploited.

Electrophoretic deposition is well suited to the manufacture of beta-alumina articles by the process described in U.S. Pat. Nos. 4,073,711 and 4,279,725 (General Electric). In that process an organic suspension of beta alumina particles is employed using amyl alcohol as the liquid media because of its dielectric properties. The particles are deposited on an electrically-charged mandrel to form thin-walled tubes with a diameter of about 1 centimeter and a wall thickness of about 1 millimeter as described in U.S. Pat. No. 4,279,725.

Electrophoresis has also been proposed as a method for speeding up the slip casting of clay earthenware or pottery as disclosed in U.S. Pat. Nos. 3,718,564 and 4,121,987. It has also been proposed for the manufacture of porcelain articles and porcelain-coated articles (see U.S. Pat. Nos. 3,484,357; 3,575,838 and 4,708,781).

The electrophoretic processes described above for use in forming of ceramic articles commonly employ aqueous suspensions containing additives, such as polyacrylic acid, triethylamine, ethanol, sodium carbonate, sodium hydroxide, sodium silicate, surface-active agents, deflocculants, etc.

In general, organic liquids are considered superior to water as a suspension medium for electrophoretic forming. The use of water-based suspensions causes a number of problems including gas evolution at the electrodes. This can cause bubbles to be trapped within the deposit. Special means have been proposed to minimize this bubble problem as by using a porous membrane and depositing the particles on the membrane as disclosed in U.S. Pat. Nos. 4,684,386 and 4,689,066. The bubble problem is less serious when using an organic suspension instead of an aqueous suspension.

The latter patents (U.S. Phillips Corporation) relate to the manufacture of thin-walled quartz-glass tubes for optical waveguides. U.S. Pat. No. 4,689,066 describes manufacture of a transparent glass tube with a diameter of 19 mm and a wall thickness of 1.2 mm from an homogenized anhydrous suspension of colloidal silica containing a quaternary ammonium compound. The organic media may be ethanol. The silica particles typically have a particle size of 15 to 100 nanometers (0.015 to 0.1 microns) with an average particle diameter of about 40 nanometers.

Electrophoretic deposition of coatings and the formation of thin-walled articles from colloidal silica can be feasible if the deposit is relatively thin. However, the deposited coating loses its conductance as the thickness of the deposit increases, thus retarding the rate of deposition. Because of this self-limiting characteristic, the buildup in the electrical resistance of the deposit can be a major problem when attempting to produce articles with substantial wall thickness.

There are a number of reasons why electrophoretic forming processes have so far achieved little commercial success. There are serious shortcomings in the fundamental understanding of the subject, and it is difficult to predict whether a given suspension will deposit electrophoretically in the desired manner. Laboratory testing has indicated that a large number of different powders can be deposited including barium and calcium carbonates, alumina, magnesia, zinc oxide, silica, titanium dioxide, indium oxide, tungsten carbide and various metals and phosphors.

It would be desirable to be able to predict from suitable parameters whether an electrophoretic deposition process will produce the desired results. The most commonly used parameters are zeta potential and electrophoretic mobility, but zeta potentials are difficult to measure or to interpret. Unfortunately there is no satisfactory theory that covers and explains all observations on electrophoretic deposition, and the subject is not well understood. Theoretical mathematical analysis has been attempted but is questionable because the equations used are based on assumptions regarding particle size and shape and theoretical models of doubtful validity (e.g., conveniently assuming that the charged particles are spherical when that is not true).

It appears that, because of lack of adequate information, misconceptions, prior failures, lack of experience or other reasons, the versatility of the advantages and potential advantages of electrophoretic deposition in the manufacture of improved glass and ceramic products were heretofore not appreciated prior to the present invention. In any event, research and development work in the field of electrophoretic deposition has been neglected, and the ceramic industry has relied on other forming processes.

In the field of investment casting where refractory shell molds are formed by the usual "lost-wax" process, it has been suggested that electrophoresis be employed during manufacture of the shell molds as disclosed in Szabo U.S. Pat. Nos. 3,850,733 and 3,882,010. In the proposed Szabo process the wax patterns are coated with graphite and dipped in an electrically-conductive coating suspension. The Szabo patents recognize that gas evolution at the anode or depository electrode creates major problems and that it is difficult to provide reliable results by electrophoretic deposition. These patents do not provide a reliable and commercially satisfactory process of substantial importance.

The problems associated with electrophoretic deposition are discussed in Norton U.S. Pat. No. 4,357,222 including the major problem of gas formation at the depository electrode (anode) from electrolysis of the slip liquid which causes serious flaws in the cast part. The Norton patent minimizes this bubble problem by providing a special non-conducting rubber mold having a relatively small anode at the bottom of the mold which forms only a small fraction of the forming surface of the mold and by moving one electrode relative to the other. A spherical casting of substantial size can be molded by filling the mold cavity with a suitable casting slip such as a suspension composed of about 86 percent by weight of silicon carbide, about 14 percent by weight of water and 0.1 percent by weight of sodium silicate. If the mold cavity is filled with a slip composed of about 50 percent water, about 50 percent elemental silicon and about 0.5 percent sodium silicate, a silicon casting is produced which can be converted to silicon nitride by standard nitriding.

The stability of the slip is less important in the non-conducting rubber mold of the Norton patent because the depository anode is at the bottom of the mold and attracts the particles in the same direction as gravity.

Unfortunately the Norton process has very limited utility and is unsuitable for formation of thick-walled articles, such as tanks, crucibles or other receptacles, where gravitational force can cause serious adverse effects.

For several decades, high-purity quartz glass articles used in the semiconductor industry have been produced by sintering porous slip-cast preforms as described, for example, in U.S. Pat. No. 4,072,489. It was known that methods other than slip casting, such as hot isostatic pressing and injection molding, could be used in making sintered quartz glass and that untested gel-casting or electrophoretic deposition methods were possible alternatives. However, serious research and development work on such alternative methods was not considered worthwhile or desirable. Prior to the present invention, there appeared to be no satisfactory substitute for slip casting and no reason to conclude or expect that problematical new methods, such as gel casting or electrophoretic deposition could become commercially successful or could provide a simple, safe, reliable and efficient process for commercial mass production of high-purity quartz glass products.

SUMMARY OF THE INVENTION

The present invention relates to the formation of high-purity porous silica preforms by a unique electrophoretic deposition process wherein a positive anode with an electrically conductive shaping surface is in contact with an aqueous suspension or slip substantially free of ionic impurities and containing electrically-charged micronized particles of high-purity silica.

The silica preforms can be formed by the process of this invention in a cup-shaped graphite mold (see FIG. 1) and then dried, fired and sintered to form clear or opaque quartz glass receptacles using a process or apparatus of the type disclosed in U.S. Pat. Nos. 3,972,704 and 4,072,489. For example, when making quartz glass crucibles for use in the semiconductor industry, fired silica preforms with a porosity of from about 15 to about 20 volume percent can be sintered in helium or in a vacuum furnace at a temperature above 1700° C. to produce full density glass.

In the practice of this invention, the particle size distribution in the slurry is very important. The sizes of the pulverized or micronized silica particles in the slurry are preferably preselected and kept within predetermined ranges to assure that the deposits at the shaping surface of the graphite mold or the anode and the walls of the silica preform have the desired porosity or density and adequate strength to permit satisfactory removal of the preform from the mold.

It is also extremely important to control the water content of the slurry at the electrodes and to maintain a substantially uniform solids content of at least about 80 percent by weight. For some reason that is not fully understood, an increase in the water content of the slurry adjacent to the cathode during the casting operation results in unacceptable and unsatisfactory deposition of the silica particles at the anode. It is necessary to control the water content of the slurry adjacent to the cathode.

This can be done in various ways as by causing the water formed at the cathode to move upwardly, by preventing or limiting movement of that water in a direction toward the anode, or by otherwise modifying or controlling the solids content of the slurry near the cathode. It is best to design and construct the cathode in such way that the water formed at the cathode is trapped. The cathode is preferably perforated or in the form of a shaped open-mesh wire screen (e.g., as in FIG. 2) and is preferably covered in a suitable manner as by a pervious or permeable shroud, sheet or membrane that permits movement of the hydroxyl ions from the slurry to the cathode and does not interfere with current flow.

In another embodiment of the invention, the porous silica preform is formed with layers of different composition. A quartz glass receptacle, for example, can be produced with an ultrapure inner layer. If the silica preform for such a receptacle is formed of three layers and the outer layers have a coefficient of expansion less than that of the middle layer, then after sintering, the outer layers of the glass will be under compression. This makes possible the production of tempered glass with exceptional durability.

The electrophoretic deposition process of the present invention is particularly well suited to the production of multi-layer silica preforms of substantial thickness. An electrically-conductive shaping mold (positive anode) can easily be immersed in several different slurries to cause the deposit of layers of any desired thickness. This permits the economical manufacture of special engineered silica glass products with improved properties and may make it possible to take advantage of the unrealized potential of glass or to eliminate or reduce some of the flaws which limit the strength and utility of most glass products.

An object of the invention is to provide a simple economical process for making ultrapure quartz glass receptacles.

Another object of the invention is to provide a simple process for economical mass production of relatively thick sintered quartz glass articles.

A further object of the invention is to provide a simple electrophoretic casting process for making high-purity silica preforms that is a satisfactory substitute for slip casting and that can be carried out commercially with safe voltages, such as 20 to 50 volts.

Other objects, uses and advantages of the invention are disclosed herein or will become apparent from the drawings, description and claims.

BRIEF DESCRIPTION OF THE DRAWINGS

FIG. 1 is a vertical sectional view on a reduced scale with parts omitted showing apparatus for producing porous silica preforms by the electrophoretic deposition method of the present invention:

FIG. 2 is a top view of the apparatus on a somewhat larger scale showing the concentric graphite anode and a cup-shaped wire-mesh cathode that replaces the perforated graphite cathode of FIG. 1;

FIG. 3 is a fragmentary sectional view on a larger scale showing a modified form of the invention, the encircled portion of the graphite cathode being shown in FIG. 2; and FIG. 4 is an isometric view on a reduced scale showing a cup-shaped silica preform that can be made in an apparatus of the type shown in FIGS. 1 and 2.

DEFINITIONS AND TERMINOLOGY

This invention is concerned with fused quartz and quartz glass containing a high percentage of silica as can be produced from quartz sand or from synthetic quartz of even higher purity. Quartz glasses commonly contain 99.5 to 99.99 percent by weight or more of silica and rarely contain more than one percent by weight of other compounds. The term "quartz", as applied to glass, excludes high-silica glasses, such as Vycor, containing 96 percent by weight of silica.

The term "high-purity quartz" as used herein refers to fused silica or quartz glass containing more than 99.99 percent by weight of silica and no more than about 50 parts per million (ppm) of contaminating metallic ions. The term "ultra-pure" as applied to silica or synthetic quartz glass suggests a silica content of at least about 99.998 percent by weight.

The dictionary term "micronized" is used herein with respect to particles which have been ground or pulverized to provide an average particle size no greater than 20 microns.

The term "sintering temperature" is used herein to indicate a temperature of at least 1300° C. sufficient to cause the silica of the porous preform to coalesce, to cause the pores of the preform to close, and to obtain a high density.

The term "high-porosity" as applied to a silica preform relates to the total volume of the pores or internal cavities rather than the width or diameter of the pores.

Silica particles are "electrophoretically mobile" in an aqueous suspension or slip when the negative charge on the particles is such that they can be readily attracted to a positive electrode at a reasonable voltage.

It will be understood that, unless the context suggests otherwise, parts and percentages are by weight rather than by volume.

DESCRIPTION OF PREFERRED EMBODIMENTS

The present invention is particularly concerned with the manufacture of high-purity vitreous silica or quartz glass products from refractory silica compositions which are molded or shaped and sintered to densify the glass.

The invention involves formation of a shaped porous silica body or preform from a refractory composition or a slurry of fine silica particles by electrophoretic deposition. Contrary to the opinions of experts in the field, electrophoretic casting has been found to be a satisfactory substitute for slip casting in the commercial manufacture of thin-wall quartz glass crucibles and other receptacles, such as bell jars. In fact it is far superior for the manufacture of the large (e.g., 20- to 30-inch) modern quartz glass crucibles now used in Czochralski (Cz) crystal-growing furnaces which crucibles have a very high purity, preferably no less than 99.998 percent.

In the past, the quartz glass crucibles were produced by conventional slip casting in standard plaster of Paris molds. Such plaster molds are a marvel and have enjoyed unparalleled success for many decades because of the unique and incredible capillary open-cell structure. Prior to the present invention, no practical substitute has been found for slip casting in the manufacture of sintered quartz glass.

There are many reasons why any attempt to make porous silica preforms would likely be unrewarding and dissuading. Binders cannot be tolerated when manufacturing Cz crucibles with the extreme purity required for crystal growing. Without binders, any electrophoretic casting process must be perfected to a substantial degree in order to produce a cup-shaped preform with the required wet strength and uniformity.

Major problems arise in the complex electrophoretic casting process because of the many variable including the particle size distribution, the electrophoretic mobility and surface charges on the charged particles, the amount of ammonium hydroxide or other electrolyte and the pH of the slurry during and after wet milling, and local dilution of the slurry at the cathode. Unwise or unfortunate choices with respect to one or more of these variables lead to poor and disappointing results. With an improper particle size distribution and/or an improper pH, it is very difficult or impossible to obtain adequate density and acceptable wet strength. The major problem will be exacerbated by local dilution of the slurry at the cathode so that the layer of silica deposited on the mold (anode) is nonuniform and lacks adequate cohesion and wet strength. The deposited layer would be a soft and pulpy flowable mass that cannot retain the intended size and shape.

The present invention, as set forth in the description which follows, solves the problems inherent in or associated with the electrophoretic casting of silica preforms and provides a superb method for producing porous silica preforms in the commercial manufacture of large ultrapure Cz crucibles (e.g., as required in the manufacture of today's 300 mm silicon wafers).

High-purity silica or fused quartz may be pulverized, micronized or reduced to appropriate micron size as described in U.S. Pat. No. 4,072,489 while maintaining the desired purity. A slurry or slip containing micronized particles of high-purity silica is preferably prepared by wet milling in a conventional ball mill having balls or stones formed of essentially pure fused quartz. The liquid employed during milling is preferably distilled water rather than an organic liquid. After milling, the average particle size of the silica particles is no more than 10 microns.

In the practice of the invention, it is usually preferable to employ high-purity silica or fused quartz with a silica content of 99.99 percent or higher. Natural or synthetic fused quartz with a reported silica content of at least 99.999 percent by weight is available commercially.

The preferred embodiment of the invention relates to the manufacture of high-purity quartz glass articles by an electrophoretic deposition process as described herein and as illustrated hereinafter in Example I.

The process is preferably carried out using an aqueous slurry consisting of pure water and high-purity micronized silica particles which have been provided with a negative electrical surface charge sufficient to provide electrophoretic mobility. Such a high-purity slurry can be prepared by wet milling silica in a ball mill for 24 to 36 hours and contains from about 15 to about 20 percent by weight of water. It preferably has a solids content of at least 80 percent by weight. The micronized silica particles usually have an average particle size of from 5 to 10 microns and usually consist of fused quartz but can include substantial amounts of crystalline silica (e.g., cristobalite or alpha quartz).

The particle size distribution in the slurry is very important and the particle sizes must be preselected or kept within predetermined ranges to assure that the deposits at the positive anode are porous and do not seriously interfere with formation of a relatively thick deposit. The silica particles of the slurry should be substantially free of colloidal silica and preferably comprise no more than one percent by weight of silica with a particle size of one micron or less and no more than 40 percent by weight of silica with a particle size of from 2 to 3 microns. The silica particles usually consist of at least 40 percent by weight of particles with a particle size of from 6 to 20 microns.

The process of this invention may be carried out using relatively simple equipment including one or more tanks or reservoirs with a volume of 20 to 40 gallons, one or more negative anodes, and electrical means for providing a direct current to cause electrophoretic deposition on positive anodes immersed in the slurry.

In the manufacture of receptacles, such as crucibles, acid tanks, bell jars and the like, a number of cup-shaped shaping molds can be used which serve as positive anodes with electrically conductive shaping surfaces on which the silica is deposited (e.g., when a series of such molds are immersed in the slurry). In a typical cup-shaped mold with a diameter of 4 to 12 inches and a height of 2 to 10 inches, for example, a relatively thick deposit can be formed by electrophoresis in a relatively short period of time. A graphite mold is preferred.

Electrophoretic deposition by the process of this invention facilitates the manufacture of special engineered quartz glass products which cannot readily be produced by other methods. A layer of any desired thickness can be deposited at the anode or shaping surface by temporarily immersing the anode in the slurry for a predetermined period of time, and a multilayer silica body can readily be produced by immersing the same anode in a series of different slurries in different tanks. By providing a series of different tanks, each containing 10 or more gallons of a suitable slurry and the associated means for carrying out electrophoretic deposition, a porous multilayer silica body or preform can readily be formed by immersing the shaping mold or anode in several different slurries sequentially.

In this manner it is convenient to form a porous silica preform having an ultrapure inner layer and other layers of lesser purity or a preform having a middle layer with a coefficient of expansion greater than that of outer layers, whereby the article produced after the final sintering in an induction furnace is a tempered quartz glass with outer surface portions under compression. A higher coefficient of expansion in the middle layer can be obtained, for example, by changing the chemical composition of the silica particles in the slurry (e.g., by adding an aluminum compound, such as aluminum oxide).

Various engineered glass articles can be produced from special multilayer silica preforms made by electrophoretic deposition. It becomes possible to provide unique products and to realize the untapped potential of glass, perhaps by reducing the microflaws which are present in all glass products and limit the strength and durability of the glass.

Multilayer silica preforms make possible the manufacture of unique and unusual quartz glass products with special characteristics. For example, a cup-shaped silica preform can be produced with an ultrapure inner layer and a number of additional layers with different calcium contents that increase in each successive layer. When such a preform is nitrided in accordance with the first-described embodiment of the present invention, the calcium acts as a catalyst, and the degree of nitriding can be increased accordingly so as to be greatest at the outer surface portions.

The electrophoretic deposition process of this invention and the equipment used to carry out the process as described above can also be used in a somewhat different manner for rapid production of thick quartz glass products by employing relatively large pieces of fused quartz to fill an electrically conductive shaping mold (anode) and then depositing micronized silica particles in the void spaces between such pieces. The pieces may, for example, have a substantial width or diameter, such as 0.3 inch or more.

An apparatus suitable for carrying out the electrophoretic casting process of the present invention is illustrated in FIGS. 1 and 2 and includes (1) a cup-shaped shaping mold or anode 2 formed primarily or essentially of a carbonaceous material, such as graphite, or other suitable electrically conductive material, (2) a hollow or cup-shaped cathode 3 formed of a suitable electrically-conductive material, such as graphite, stainless steel, etc., and (3) means including a direct-current source for causing current flow at a voltage of 10 to 100 volts, preferably less than 70 volts. The cathode 3 is preferably a cup-shaped open-mesh wire screen, such as the screen S of FIG. 2, but can be a perforated thin-wall graphite cup, somewhat similar to the cup 2a of FIG. 3, with perforations permitting free inward flow of liquid.

The electrically conductive mold 2 has a cylindrical wall portion 4 with a smooth inner cylindrical surface, preferably with a slight taper of at least one degree to facilitate mold release during removal of the silica preform (B). The flattened bottom wall portion 5 of the mold has a rounded marginal portion 6 and is sometimes generally rectangular or square but is preferably circular with a diameter less than or greater than the vertical height of the mold.

The outer surface of the cathode 3 (or screen S) preferably has a shape similar to or corresponding to that of the inner shaping surface of the anode 2. As shown in FIG. 1, the cathode has a cylindrical portion 7 concentric to the wall portion 4 and a flat circular portion 8 that is rounded at the periphery. The concentric cups 2 and 3 provide an annular space 13 and a bottom space 14 that are filled with an aqueous high-purity slurry containing evenly distributed micronized particles of silica.

FIGS. 1 and 2 are primarily intended to facilitate an understanding of the electrophoretic casting process of this invention and the basic features of the process rather than specific details of a commercial apparatus. They are crude to some extent and somewhat schematic in nature but are drawn substantially to scale. It will be understood, of course, that the dimensions and proportions may vary substantially. For example, the outside diameter or outer width of the cathode 3 could be from about one-half to about three-fourths of the inner diameter of the graphite anode 2.

The vertical width of the space 14 (i.e., the vertical distance between the horizontal flat wall portions 5 and 8) is preferably about the same as or no more than about 20 percent greater than the radial horizontal width of the annular space 13 (i.e., the radial distance between the cylindrical walls of the anode 2 and the cathode 3).

The basic elements of an apparatus suitable for use in the practice of the electrophoretic casting process of this invention are shown as an example in FIG. 2. FIG. 1 shows additional means including an annular quartz glass cover C and a cup-shaped outer cover or housing 9 which may be advantageous but are optional and can be omitted, if desired.

The outer cup 9 supports the shaping mold 2 with its vertical wall 4 concentric to and spaced from the corresponding cylindrical wall portion 10 of the cup and its bottom wall parallel to and spaced from the flat bottom wall 11 of the cup, whereby an air space is provided around and below the mold. Suitable pump means, such as a motor-driven air pump or vacuum pump may be provided to reduce the pressure in the annular air space 12 during electrophoretic deposition (e.g., when using the porous carbonaceous shaping mold of FIG. 3) or to increase the air pressure temporarily to facilitate mold release while the silica preform (20) is being removed.

As shown in FIG. 1, a removable annular cover member C of generally L-shaped cross section is mounted on top portions of the cylindrical wall portions 4 and 10, and a removable short cylindrical member 15 of uniform thickness is mounted on the top portion of the cathode 3 concentric to the cylindrical inner surface 16 of the cover member C to provide an annular space 17 above the annular space 13 to receive additional amounts of slurry. If desired the vertical height of the space 17 can be increased substantially over that shown (e.g., increased 30 to 50 percent or more).

The cover member can be a molded quartz glass annulus 23 of L-shaped cross section having a radial flange 24 with concentric grooves that fit the top portions of the walls 4 and 10. The annulus 23 need not-interfere with removal of the wet preform from the shaping mold 2. If the innermost cylindrical surface 16 has a diameter equal to or somewhat greater than the inner diameter of the mold at surface 4, it is not necessary to separate the cover C from the mold before removing the preform.

It is necessary to remove the cathode 3 and the glass cylinder 15 from the interior of the mold 2 before removing the wet preform (20), but it is not necessary to separate the cylinder from the cathode.

FIG. 4 shows a cup-shaped silica body or preform B of the type formed by the electrophoretic casting process of this invention. The preform comprises a thin-wall receptacle with a cylindrical wall 21 having a flat circular upper surface 22 and a smooth outer surface matching the cylindrical internal surface 4 of the mold 2 and with a smooth bottom surface matching the bottom shaping surface of the mold at 5. A typical silica preform 20 with a diameter of from 15 to 25 inches could, for example, have a density of from 80 to 85 percent and a wall-thickness of from about 0.2 to about 0.35 inch.

Release of the silica preform from the graphite shaping mold is facilitated by providing the mold surface 4 with a slight taper of 1.0 to 1.5 degrees or so and by reversing the polarity so that the mold becomes a negative electrode that repels the negatively charged preform. If the mold is porous and/or provided with perforations (e.g., as in FIG. 3), then, in that event, the release of the preform can be assisted by pressurizing the sealed air space 12 surrounding the mold.

In a modified embodiment of the invention of the type shown in FIG. 3 wherein the entire shaping mold 2a is formed from particles of a carbonaceous material, such as carbon or graphite, to provide the desired porosity and permeability, it becomes possible to remove water from the mold during the electrophoretic deposition process. Outward movement of the water can be facilitated by providing a multiplicity of closely spaced bored holes 18 as shown in FIG. 3, for example, and by providing a pressure difference between the inside and outside surfaces of the mold. The desired pressure difference can be the result of reducing the pressure in the chamber 12 by operation of a vacuum pump or the result of pressuring the interior of the mold and the slurry filling the mold cavity. In either case, the air pressure acting on the slurry may promote outward movement of small amounts of water from the layer of silica particles deposited on the shaping surfaces of the mold 2a and should tend to increase the rate of deposit. Such use of air pressure with a porous graphite mold in accordance with this invention may be advantageous in the manufacture of large crucibles and other large receptacles with wall thicknesses of 0.3 inch to 0.5 inch or greater. Methods for making porous graphite are known as disclosed in U.S. Pat. No. 4,121,987, for example.

EXAMPLE I

A slurry is prepared by wet milling ultrapure fused quartz in a ball mill using deionized water and ultrapure fused quartz grinding media. The silica particles are milled for an extended period of time more than 24 hours to provide an extremely pure slip or slurry with a pH of from 2 to 4, an average particle size of at least 6 microns, and a solids content of at least 82 percent by weight.

The micronized silica particles of the slurry are milled for an extended period of time to increase the negative surface charge and provide such particles with the necessary electrophoretic mobility. The negative charge is further increased by slowly adding dilute ammonium hydroxide to the slurry.

About 20 gallons of a slurry prepared in this manner and having a solids content of at least 80 percent by weight is placed in a large tank or reservoir containing a negative electrode or cathode. A cup-shaped graphite mold or other electrically-conductive shaping mold with a diameter of about six inches and a height of at least about three inches is immersed in the slurry to provide a positive anode. A direct electric current is then imposed with a voltage sufficient to attract the silica particles to the electrically conductive shaping surface of the mold and to cause rapid deposit of the particles at that surface.

During the electrophoretic deposition process the charged silica particles are maintained in suspension, the slurry is maintained at a solids content of at least about 82 percent by weight, and the water content of the slurry adjacent to the electrodes is controlled to maintain uniformity in the slurry.

After the cup-shaped porous silica body or preform deposited on the shaping mold has the desired wall thickness (e.g., a thickness of from 0.25 to 0.3 inch), the mold is removed from the slurry, the silica body is removed from the mold, dried and then fired at a temperature of 1050° C. to 1100° C. The resulting product with a porosity of about 20 volume percent can then be sintered in helium for 8 to 10 minutes or more in an induction furnace to a temperature of about 1750° C. to provide a full density transparent glass receptacle. The final sintering in the induction furnace may be substantially as described in the aforesaid U.S. Pat. No. 4,072,489.

EXAMPLE II

A cup-shaped electrically-conductive wire-mesh screen comparable to that shown in FIG. 2 is supported within a cup-shaped graphite mold comparable to that shown in FIGS. 1 and 2 and having an elongated cylindrical shaping surface with a diameter of about 20 inches concentric to the cylindrical portion of the screen. The mold and the metal screen are operably connected to a direct current source that can apply a regulated voltage of from 10 to 70 volts or more, the graphite mold providing a positive anode and the screen providing a negative cathode well suited for electrophoretic casting of silica preforms.

An ultrapure silica slurry generally similar to that of Example I having an average particle size of from 6 to 8 microns, a pH of from 7.5 to 8.5, and a solids content of about 83 to about 84 percent by weight is poured into the graphite mold to fill the space (13, 14) between the mold and the cathode screen (See FIG. 1).

The screen is covered by a cup-shaped pervious or permeable sheet or membrane of uniform thickness that separates the screen from the slurry while allowing free movement of hydroxyl ions to the cathode (as in FIG. 1, at 25).

The electrophoretic casting process is initiated by applying a voltage of from 20 to 25 volts for at least several minutes to deposit a porous layer of ultrapure silica on the smooth inner surface of the mold. The voltage is then increased as the wall thickness of the wet silica preform increases. Additional slurry is added to the mold when needed. The voltage can be increased to 30 to 40 volts, if desired, to increase the rate of deposition after the thickness of the deposit exceeds 0.2 inch or so.

When the silica preform has the desired wall thickness (e.g., 0.25 to 0.35 inch or more), the voltage is reversed to provide the graphite mold with a negative charge (up to 40 to 50 volts, for example) that separates the wet preform from the mold. The cylindrical shaping surface of the mold is tapered slightly to facilitate the mold release.

After the wet silica preform has been removed from the casting mold, it is dried, fired and sintered in the manner described in Example I to provide an ultrapure transparent quartz glass receptacle.

The ultrapure silica slip or slurry used in forming silica preforms in Examples I and II preferably has a predetermined particle size distribution to improve the wet strength of the silica preform and obtain the desired porosity (e.g., in the range of 15 to 20 volume percent). A preferred silica slurry has a solids content of from 82 to 84 percent by weight and a particle size distribution by weight as follows:

10 to 15 percent from 20 to 30 microns
40 percent or more from 6 to 20 microns
20 to 40 percent from 1 to 6 microns
3 to 10 percent below 1 micron The colloidal or extremely fine silica particles of the slurry can be present in small amounts, preferably no more than about one percent by weight.

A slurry with a particle size distribution of the type described above can be made by ball milling the silica for 20 hours or more at a pH below 5 and then adding dilute ammonium hydroxide and continuing the ball milling for an additional 4 to 6 hours or more at a pH of 6 to 7 to provide the micronized silica particles with excellent electrophoretic mobility. More ammonium hydroxide is added to the final slurry to provide a pH of 7.5 to 8 or more before the slurry is added to the electrophoretic casting mold as in Example II.

By using an ultrapure silica slurry of the type described above with a solids content of 83 to 84 percent by weight and a pH of from 7 to 9, good results are obtained when making large silica preforms, such as those used for making transparent thin-wall quartz glass crucibles with diameters of 24 inches or more. The procedure described in Example I would be unacceptable for making the large crucibles.

In the simplified process of Example I the silica can be milled for 30 hours to provide a slurry with a solids content of about 82 to 84 percent by weight and the electrophoretic deposition can be carried out with a relatively high voltage, such as 100 to 120 volts. However, for safety reasons a lower voltage should be used, such as 30 to 50 volts.

A rotary mixer could be provided in the tank or reservoir of Example I and the rotary blades of the mixer could be operated at rotational speeds high enough to help obtain better uniformity in the solids content of the slurry. Continuous operation of the mixer is undesirable and counterproductive in reducing the rate of deposition, but periodic operation of the mixer for brief periods of time might be acceptable. It is, of course, preferable to employ a hollow perforated cathode or wire screen having a pervious cover of the type shown in FIGS. 1 and 2 (e.g., as described in Example II) so that there is no water problem at the cathode and a rotary mixer is undesirable and unnecessary.

A small silica preform of the type described in Example I can be made in a manner similar to that described in that Example using a pure electrically-conductive slip with a pH of from 4 to 5, but the wet strength of the preform is marginal and might be unsatisfactory. Best results would be obtained using a higher pH, such as 7.5 to 8 or more. A pH of 5 is not acceptable when making large thin-wall preforms of the type described in Example II.

It will be understood that the tank or reservoir of Example I can be of adequate size to accommodate at least several metal shaping molds (anodes) and more than one cathode, and additional slurry can be added or excess water removed to maintain the desired solids content.

It will be understood that variations and modifications of the compositions, methods, devices and products disclosed herein may be made without departing from the spirit of the invention.

What is claimed is:

1. An electrophoretic deposition process for making quartz glass products comprising preparing an aqueous slurry consisting essentially of high-purity micronized silica particles and water, providing said silica particles with a negative electrical surface charge sufficient to provide electrophoretic mobility, providing negative and positive electrodes in contact with said slurry, said electrodes having associated means for separating and removing excess water from the slurry, the positive electrode having an electrically conductive portion providing a shaping surface, said slurry being electrically conductive and substantially free of contaminating metallic ions, maintaining said particles in suspension while controlling the water content of the slurry adjacent to the electrodes, causing the charged silica particles to be deposited at the positive electrode to form a porous silica body of substantial thickness on said shaping surface, separating the silica body from the shaping surface and drying and firing the silica body, the solids content of the slurry adjacent the shaping surface being maintained at about 80 percent by weight or higher during the electrophoretic deposition.

2. In an electrophoretic deposition process for making a shaped sintered quartz glass article from an aqueous slurry formed of high-purity silica particles and at least about 15 percent by weight of water, wherein a porous silica body of substantial thickness is deposited on the shaping surface of a casting mold, and the silica body is separated from the mold, dried and fired to provide a rigid high-purity silica preform, the improvement wherein the silica particles of the slurry are provided with a negative electrical surface charge sufficient to provide electrophoretic mobility, and negative and positive electrodes are provided in contact with the aqueous slurry, the electrodes having associated means for separating and removing excess water from the slurry, the mold being the positive anode and having an electrically-conductive shaping surface to attract the charged particles, the water content of the slurry adjacent to the electrodes being controlled, the solids content of the slurry adjacent the mold being maintained at about 80 percent by weight or higher during the electrophoretic deposition.

3. An electrophoretic deposition process for making quartz glass products comprising preparing an aqueous slurry consisting essentially of high-purity micronized silica particles and water, providing said silica particles with a negative electrical surface charge sufficient to provide electrophoretic mobility, providing negative and positive electrodes in contact with said slurry, the positive electrode having an electrically conductive portion providing a shaping surface, said slurry being electrically conductive and substantially free of contaminating metallic ions, maintaining said particles in suspension while controlling the water content of the slurry adjacent to the electrodes, causing the charged silica particles to be deposited at the positive electrode to form a porous silica body of substantial thickness on said shaping surface, separating the silica body from the shaping surface, and drying and firing the silica body, the solids content of the slurry adjacent the shaping surface being maintained at about 80 percent by weight or higher during the electrophoretic deposition.

4. A process for making quartz glass products according to claim 2 comprising preparing a series of slurries of different composition, each consisting essentially of micronized silica particles and water, immersing in each slurry a shaping mold comprising a positive anode to cause the electrophoretic deposition of silica particles, removing the shaping mold from that slurry when the deposited silica layer has the desired thickness and immersing it in other slurries to cause the deposition of subsequent silica layers, separating the multi-layer silica body from the shaping mold, and firing the same.

5. A process according to claim 4 wherein a porous silica preform is deposited on the shaping mold and has an inner layer with a purity of at least about 99.998 percent and other layers of lesser purity.

6. A process according to claim 4 wherein a silica preform is deposited on the shaping mold which has a middle layer with a coefficient of expansion greater than that of outer layers, whereby the glass article produced after the final sintering in a furnace is a tempered quartz glass with outer surface portions under compression.

7. A process according to claim 2 wherein the anode is a cup-shaped mold consisting essentially of silica and no more than one percent by weight of other compounds.

8. An electrophoretic casting process for making porous silica preforms suitable for use in the manufacture of sintered high-purity quartz glass receptacles, said process comprising preparing a basic aqueous slurry containing an electrolyte and consisting essentially of high-purity micronized silica particles and water, furnishing said silica particles with a negative surface charge sufficient to provide electrophoretic mobility, providing a cup-shaped carbonaceous mold with an internal conductive shaping surface that serves as a positive anode, locating within the mold a hollow electrically-conductive cathode having a pervious cover means that permits movement of hydroxyl ions from the slurry to the cathode to control the water content of the slurry, supplying slurry to the interior of the mold to cover the anodic shaping surface and the cathode cover means, applying a direct current with a voltage sufficient to move the charged silica particles toward the anode and to cause them to be deposited at the shaping surface and to form a porous cup-shaped silica preform, separating the wet preform from the mold, drying the preform, and thereafter firing the preform, the solids content of the slurry adjacent the mold being maintained at about 80 percent by weight or higher during the electrophoretic deposition.

9. A process according to claim 8 wherein the micronized silica particles have an average particle size of from 5 to 10 microns, at least 40 percent by weight of the particles have a particle size of from 6 to 20 microns and up to 40 percent have a particle size of from 2 to 3 microns, and wherein the particle size distribution facilitates formation of a preform having wet strength and a porosity no greater than about 20 volume percent.

10. A process according to claim 8 wherein the applied voltage during most of the electrophoretic casting operation is from 10 to 40 volts and the voltage is thereafter increased substantially to increase the rate of deposit at the mold.

11. In an electrophoretic deposition process for making transparent quartz glass receptacles from a cup-shaped porous silica preform wherein an aqueous slurry is prepared consisting essentially of high-purity micronized silica particles and at least 15 percent by weight of water, the silica particles are wet milled to provide an average particle size up to 10 microns, the slurry is poured into a cup-shaped casting mold, the silica is deposited on the internal shaping surface of the mold to form a wet porous silica preform with a wall thickness of at least about 0.2 inch, the preform is separated from the mold, dried and fired at a temperature of from 1000° to 1200° C., and the resulting fired preform with a porosity of at least 15 volume percent is sintered in helium in a furnace to a temperature at least 1700° C. to produce a full-density quartz glass receptacle, the improvement wherein the slurry has a pH of at least 7 with a predetermined particle size distribution, at least 40 percent by weight of the silica particles having a particle size of from 6 to 20 microns, the average particle size is from 5 to 10 microns, the particles have a negative electrical surface charge sufficient to provide electrophoretic mobility, the slurry is electrically conductive, the mold is an electrically-conductive positive electrode or anode having an internal negative electrode or cathode, means are provided for controlling the water content of the slurry adjacent to the electrodes, and a direct current is imposed to attract the silica particles to the anodic shaping surfaces of the mold and thereby form a porous silica preform by electrophoretic deposition, the solids content of the slurry adjacent the mold being maintained at about 80 percent by weight or higher during the electrophoretic deposition.

12. In a process for making high-purity quartz glass receptacles wherein a cup-shaped preform formed of compacted micronized particles of vitreous silica and having a porosity of at least 15 volume percent is dried, fired and sintered to a temperature above 1700° C., the improvement wherein an aqueous slurry consisting essentially of charged high-purity micronized silica particles and water and having a pH of from 7 to 9 is prepared by wet milling a silica composition having a predetermined particle size distribution to provide the particles with a substantial surface charge and electrophoretic mobility, an electrophoretic casting means is provided including a cup-shaped conductive mold serving as a positive anode and an internal shaped cathode having means for controlling the water content of the slurry and for containing and resisting local dilution of the slurry due to rapid formation of water at the cathode, the solids content of the slurry adjacent the mold being maintained substantially uniform at 80 to 85 percent by weight.

13. A process according to claim 11 wherein the shaping mold is formed from carbon particles and has a generally uniform capillary network of open pores with a pore size of from 1 to 10 microns, water is forced through the porous carbonaceous mold by air pressure during electrophoretic casting of the wet silica preform, and gas pressure is provided to facilitate removal of the wet preform from the mold.

14. A process according to claim 12 wherein the electrophoretic casting means includes a direct current source that can impose a direct current on the electrolytic slurry with a voltage of 20 to 40 volts or more, a cup-shaped graphite mold and a covered cup-shaped pervious or perforated cathode that is centrally located or substantially concentric to the mold and has means for separating the cathode from the surrounding slurry without impeding or preventing rapid movement of hydroxyl ions to the cathode.

15. A process according to claim 2 wherein filter means, such as a permeable membrane, is provided to separate water from the slurry.

16. A process according to claim 3 wherein the silica deposits on the shaping surface of the positive electrode have a porosity greater than 15 volume percent, and the slurry is filtrated during the electrophoretic deposition to remove water and avoid substantial dilution of the slurry.

17. A process according to claim 16 wherein the positive electrode is a cup-shaped mold, and excess water at the negative electrode is separated from the slurry during the electrophoretic deposition by a pervious cover or sheet without mixing the slurry or causing undesirable reduction in the rate of deposition.

\* \* \* \* \*